(12) United States Patent
Talagala et al.

(10) Patent No.: US 10,863,156 B2
(45) Date of Patent: Dec. 8, 2020

(54) IMAGE PROCESSING

(71) Applicant: Apical Limited, Cambridge (GB)

(72) Inventors: Dumidu Talagala, Coventry (GB); David Hanwell, Stapleford (GB); Viacheslav Chesnokov, Loughborough (GB); Alexey Kornienko, Loughborough (GB)

(73) Assignee: Apical Ltd., Cambridge (GB)

( * ) Notice: Subject to any disclaimer, the term of this patent is extended or adjusted under 35 U.S.C. 154(b) by 72 days.

(21) Appl. No.: 16/371,922

(22) Filed: Apr. 1, 2019

(65) Prior Publication Data
US 2019/0306480 A1 Oct. 3, 2019

(30) Foreign Application Priority Data

Apr. 3, 2018 (GB) .................................. 1805465

(51) Int. Cl.
| | | |
|---|---|---|
| *G06K 9/00* | (2006.01) | |
| *H04N 9/68* | (2006.01) | |
| *G06T 3/40* | (2006.01) | |
| *H04N 5/235* | (2006.01) | |
| *G06T 5/00* | (2006.01) | |
| *G06T 5/40* | (2006.01) | |

(52) U.S. Cl.
CPC ............. *H04N 9/68* (2013.01); *G06T 3/4015* (2013.01); *G06T 5/007* (2013.01); *G06T 5/40* (2013.01); *H04N 5/2351* (2013.01)

(58) Field of Classification Search
CPC ...... H04N 9/68; H04N 5/2351; H04N 5/2355; H04N 9/07; H04N 9/646; H04N 5/355; H04N 5/217; H04N 9/73; H04N 9/69; H04N 5/243; H04N 9/04515; G06T 3/4015; G06T 5/007; G06T 5/40
See application file for complete search history.

(56) References Cited

U.S. PATENT DOCUMENTS

| | | | |
|---|---|---|---|
| 2007/0047803 A1* | 3/2007 | Nikkanen | ............ H04N 1/6027 382/162 |
| 2012/0294527 A1* | 11/2012 | Lukac | .................... H04N 9/646 382/167 |
| 2017/0078596 A1 | 3/2017 | Chesnokov et al. | |

OTHER PUBLICATIONS

Combined Search and Examination Report dated Sep. 20, 2018 for GB Application No. GB1805465.0.

* cited by examiner

*Primary Examiner* — Dhaval V Patel
(74) *Attorney, Agent, or Firm* — EIP US LLP

(57) ABSTRACT

Image data representative of at least a portion of an image comprising first and second sets of pixels associated with first and second colour channels, respectively, is received. It is determined that a first pixel of the first set of pixels is a saturated pixel. First data based on a value of the first pixel of the second set of pixels is obtained for a first image region comprising the first pixel of the first set of pixels and a first pixel of the second set of pixels. Second data based on respective values of second pixels of the first and second sets of pixels are obtained, based on the first data, for a second image region. The second data is processed to generate output data representative of an estimated value associated with the first colour channel for the first pixel.

20 Claims, 7 Drawing Sheets

IMAGE PROCESSING

CROSS-REFERENCE TO RELATED APPLICATIONS

This application claims priority to UK Application No. GB 1805465.0, filed Apr. 3, 2018, under 35 U.S.C. § 119(a). The above-referenced patent application is incorporated by reference in its entirety.

BACKGROUND OF THE INVENTION

Field of the Invention

The present invention relates to methods and apparatus for processing image data.

Description of the Related Technology

Image sensors are typically capable of capturing an image of scene with a smaller dynamic range than that perceivable by the human visual system, where the dynamic range is for example the ratio between the pixel intensities of the brightest and darkest pixels within an image. For example, the human eye can perceive a dynamic range in excess of 55 dB (decibels), whereas image sensors may have a dynamic range of between 35 dB and 45 dB. The quality of images of high dynamic range scenes, such as outdoor scenes with motion or night time scenes with bright lights, may therefore be reduced in images captured by image sensors compared with the perception of such scenes by a human in real-time.

SUMMARY

According to a first aspect, there is provided a method comprising: receiving image data representative of at least a portion of an image comprising a first set of pixels associated with a first colour channel and a second set of pixels associated with a second colour channel; processing a portion of the image data representative of a first pixel of the first set of pixels to determine that the first pixel of the first set of pixels is a saturated pixel; obtaining, for a first image region comprising the first pixel of the first set of pixels and a first pixel of the second set of pixels, first data based on a value of the first pixel of the second set of pixels, based on the first data, obtaining, for a second image region comprising a second pixel of the first set of pixels and a second pixel of the second set of pixels, second data based on a value of the second pixel of the first set of pixels and a value of the second pixel of the second set of pixels; and processing the second data to generate output data representative of an estimated value associated with the first colour channel for the first pixel of the first set of pixels.

An image sensor is typically capable of detecting light within a limited range of intensities, which for example may correspond to a limited range of brightnesses. This range may be considered to correspond to the dynamic range of the image sensor. Intensity values which are beyond the maximum intensity that the image sensor can detect will be set to the same maximum value. This is sometimes referred to as clipping. For example, an image sensor may be arranged to capture an image of a scene using a relatively long exposure, to capture detail in dark parts of the scene. With this approach, however, sensor pixels of the image sensor which correspond to bright parts of the scene may be saturated. For example, the brightness of these parts of the scene may exceed a maximum brightness capable of being recorded by the sensor pixels (for example after initial processing of the image data representing the scene, such as white balance correction and lens shading correction, to correct for unwanted artefacts introduced in the image by the image sensor). In such cases, pixel intensity values for saturated pixels are clipped, which may reduce detail in bright parts of a scene. Hence, in examples herein, saturation refers to saturation of pixel values that have exceeded a predetermined maximum value, rather than saturation in the context of a colour (which is for example the colourfulness of an area in proportion to its brightness).

The method according to examples allows a more accurate estimated value for the saturated pixel to be determined. The estimated value may be larger than a saturated value of the saturated pixel, such as the intensity value of the saturated pixel after clipping, which may be a predetermined maximum intensity value. In this way, the dynamic range of the image data may be extended, and detail in bright parts of the image (which for example correspond to saturated pixels) may be improved.

According to a second aspect, there is provided an image processing system comprising: storage for storing: image data representative of at least a portion of an image comprising a first set of pixels associated with a first colour channel and a second set of pixels associated with a second colour channel; first data based on a value of a first pixel of the second set of pixels; second data based on a value of a second pixel of the first set of pixels and a value of a second pixel of the second set of pixels; and output data representative of an estimate value associated with the first colour channel for a first pixel of the first set of pixels; a saturation correction system operable to: process a portion of the image data representative of the first pixel of the first set of pixels to determine that the first pixel of the first set of pixels is a saturated pixel; obtain, for a first image region comprising the first pixel of the first set of pixels and the first pixel of the second set of pixels, the first data; based on the first data, obtain, for a second image region comprising the second pixel of the first set of pixels and the second pixel of the second set of pixels, the second data; and process the second data to generate the output data.

The saturation correction system may be implemented in hardware or software or a combination of hardware or software. For example, the saturation correction system may be implemented as a set of computer-readable instructions stored on a non-transitory computer-readable storage medium, which, when executed by at least one processor, cause the at least one processor to perform the method of the saturation correction system.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
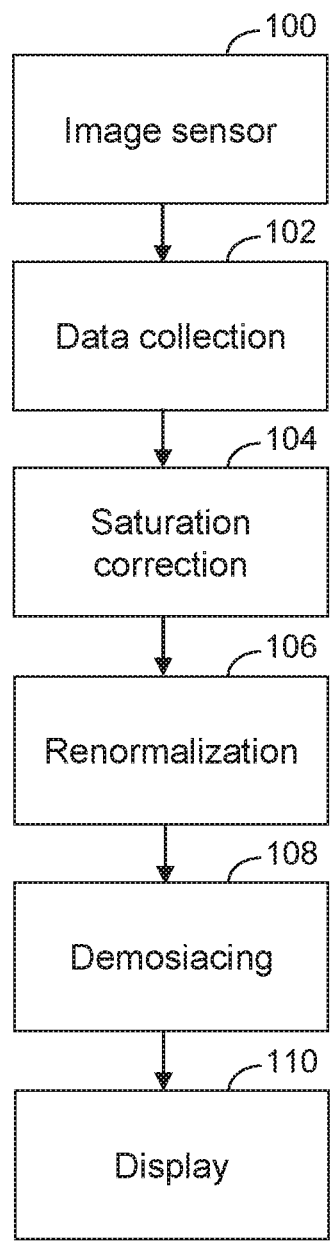
FIG. 1 shows schematically a method of processing image data according to examples.

FIG. 1 shows schematically a method of processing image data according to examples. The image data is representative of at least a portion of an image, and is captured using an image sensor 100. An image sensor typically includes an array of sensor pixels, which may be any suitable photo-sensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). An exposure typically sets the time period over which light is captured by each sensor pixel of the image sensor and/or the gain applied by an amplifier to the electrical signal generated by each sensor pixel. The sensitivity of an image sensor to incident light is therefore generally determined by the exposure. In the example of FIG. 1, the image sensor 100 is arranged to capture the image data using a single exposure. For example, all the sensor pixels of the image sensor 100 may capture light during the same time period or during a time period of the same length as each other. However, in other examples, an image sensor for use with examples described herein may be a multi-exposure image sensor, which is arranged to capture the image data using sensor pixels with at least two different exposures.

The image data for example represents at least one characteristic of the light captured by the image sensor 100. For example, the image data may be representative of an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data. The image data may be in any suitable format, such as a raw image format. For example, the image data may be streamed from the image sensor, with or without being saved to a framebuffer, without saving the raw image data to a file. In such cases, image data obtained after processing of the raw image data may, however, be saved to a file.

In examples such as FIG. 1, the image sensor 100 includes a colour filter array that includes a pattern of colour filter elements. Colour filter elements correspond to respective sensor pixels of an array of sensor pixels of the image sensor 100. For example, the colour filter array may be considered to form a mosaic or repeating pattern. A colour filter element generally allows light of a particular colour to pass through to the corresponding sensor pixel. In this way, the colour filter array allows different sensor pixels of the array of sensor pixels to receive different colours of incident light, allowing a full-colour image to be captured. As typical photosensors are not sensitive to the wavelength of incoming light, typical sensor pixels would be unable to provide colour information from the detected light without a colour filter array. However, by separating incoming light into different wavelength ranges, corresponding to different colours, using the colour filter array, the intensity of light in these different wavelength ranges can be ascertained, allowing this colour information to be determined.

It is to be appreciated that a colour may refer to any range of wavelengths of light. For example, a clear, transparent or white colour filter element may nevertheless be considered to be a colour filter element in the sense that the colour filter element allows these particular wavelengths (such as all or substantially all) wavelengths in the visible spectrum to be transmitted to the underlying sensor pixel. In other examples, some or all of the colour filter elements may be non-white colour filter elements.

A pattern of colour filter elements may be formed of repeating groups of colour filter elements. A group of colour filter elements may for example include a red colour filter element, a blue colour filter element and two green colour filter elements. The colour filter array may therefore correspond to a Bayer pattern, although other groups are possible in other examples. Each group may correspond with the necessary sensor pixels to obtain a full-colour image of a suitable quality.

The image obtained by the image sensor 100 in examples in accordance with FIG. 1 includes a first set of pixels associated with a first colour channel and a second set of pixels associated with a second colour channel. The first set of pixels may therefore be captured by a first set of sensor pixels corresponding to colour filter elements of the first colour channel and the second set of pixels may be captured by a second set of sensor pixels corresponding to colour filter elements of the second colour channel. The first colour channel may be one of: red, green, or blue and the second colour channel may be a different one of: red, green, or blue (although this is not intended to be limiting). In further examples, the image obtained by the image sensor 100 may also include a third set of pixels associated with a third colour channel (which may be different from the first and second colour channels, such as a different one of: red, green, or blue than the first and second colour channels). In such cases, the third set of pixels may be captured by a third set of sensor pixels corresponding to colour filter elements of the third colour channel. Examples of first, second and third sets of pixels are described further below with reference to FIGS. 3, 6 and 8.

Referring back to FIG. 1, the method of FIG. 1 involves processing the image data obtained by the sensor 100 using a data collection process 102 to obtain data for use in saturation correction, for example to obtain an estimated value for a saturated pixel. This data may be referred to as second data herein and is described in detail below with reference to FIGS. 2 to 5.

After the data collection process 102, a saturation correction process 104 is performed in the method of FIG. 1. This is explained further below with reference to FIGS. 6 to 9.

A renormalization process 106 is performed to renormalize the output image data obtained via the saturation correction process 104 to a predetermined range, as described further below.

Demosaicing 108 is then performed to reconstruct a full colour image from the normalized output image data. The renormalized output image data for example includes an intensity value for solely one colour channel per pixel location, whereas the demosaicing 108 allows an intensity value for each of a plurality of different colour channels to be obtained for each pixel location. For example, as explained above, a typical image sensor includes sensor pixels, each overlaid with a colour filter element of a particular colour. Hence, each pixel output from the image sensor also typically includes an intensity value for only one colour channel prior to demosaicing 108. Demosaicing 108 for example involves interpolating between adjacent pixels of the same colour channel (described herein as belonging to the same set of pixels) to obtain a value at a location between these adjacent pixels, such as at a location corresponding to a pixel of a different colour channel, such as of a different set of pixels. This may be performed for each of the colour channels in order to obtain, at each pixel location, an intensity value for each of the colour channels.

Finally, the processed image data is output for display 110.

It is to be appreciated that the method of FIG. 1 is merely an example and that some elements may have been omitted or simplified for conciseness. For example, prior to the saturation correction process 104, the image data may undergo further processing to improve a quality of the image. For example, the image may suffer from lens shading, which typically causes the brightness or intensity of an image to gradually decrease radially away from the centre of the image. The colour balance of the image may also be sub-optimal, meaning that the colours of the image may not accurately correspond with the colours of the scene captured in the image. Hence, this further processing may include white balance adjustment or processing to correct for lens shading.

Typically, though, the data collection 102 of FIG. 1 is performed prior to correcting for white balance and/or lens shading (although the data collection 102 in some examples may be performed after one or both of these processes). For example, a pixel may be considered to be saturated if a value of the pixel (such as an intensity) is such that it would be limited or clipped after correction for white balance and/or lens shading. In addition, a pixel may be also be considered to be saturated if the value of the pixel has already been limited or clipped to a maximum predetermined value. Hence, a pixel may be considered saturated if the value of the pixel either meets or exceeds a maximum predetermined value.

After the renormalization process 106, yet further processing to further improve a quality of the image (or to adjust the image to obtain a desired visual effect) may be applied. For example, a colour correction or gamma correction process may be applied to the image data.

Features of FIG. 1 will now be explained in more detail.

Data Collection

The data collection process 102 of FIG. 1 is illustrated further in FIGS. 2 to 5.

Figure 2:
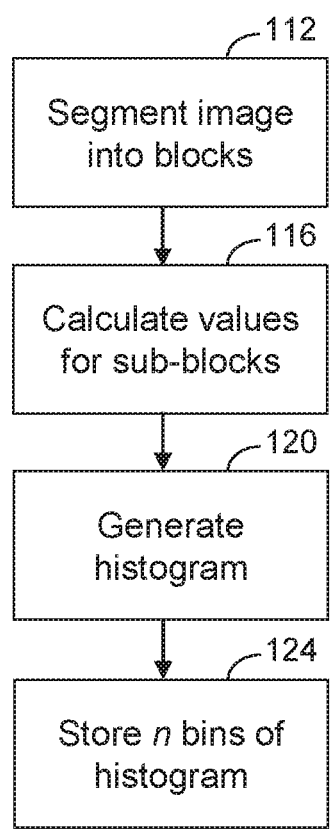
FIG. 2 is a flow diagram illustrating an example method of collecting data for use in the method of FIG. 1.

FIG. 2 is a flow diagram illustrating an example method of collecting data for use in the method of FIG. 1. At item 112 of FIG. 2, the image captured by the image sensor 100, which may be represented by the image data, is segmented into blocks. The image represented by the image data may be the entirety of a scene captured by the image sensor 100 or may instead represent a portion or subset of the scene. Each block may be referred to herein as a second image region and may be a predetermined image region of a predetermined size. For example, an array of pixels of the image may be divided into blocks of n by m pixels, where n and m are integers. For example, the image may be divided into blocks which each include 33 by 33 pixels. However, this is not intended to be limiting and, in other cases, the second image region may be other sizes or shapes, such as a non-square rectangle or an irregular shape. For example, the second image region may be any suitable shape and size in order to allow meaningful colour or hue characteristics representative of an area of the image to be determined.

Figures 3, 4:
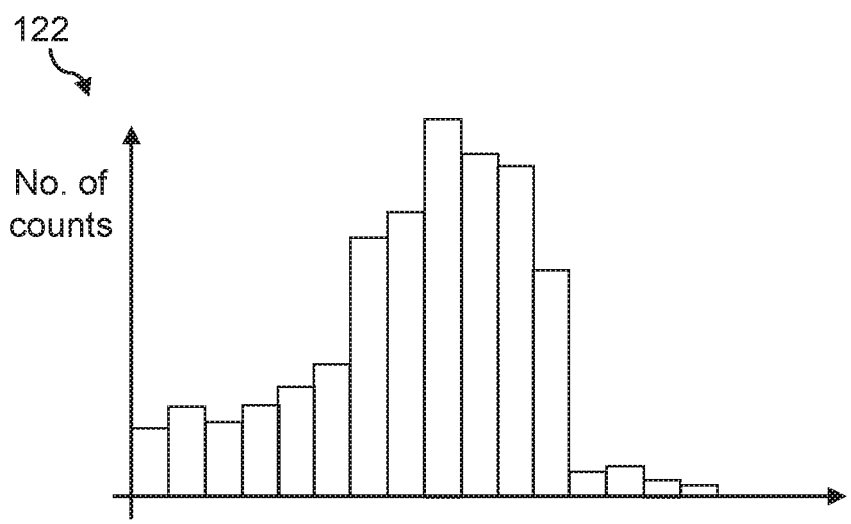
FIG. 3 shows schematically an example of segmenting a block of an image into sub-blocks.
FIG. 4 shows an example histogram obtainable from a block of an image such as the block of FIG. 3.

An example of a block 114 is shown schematically in FIG. 3. The block 114 of FIG. 3 includes a first set of pixels associated with a first colour channel, which in this example is green, a second set of pixels associated with a second colour channel, which in this example is blue, and a third set of pixels associated with a third colour channel, which in this example is red. Pixels of the first set of pixels are each labelled with a "G", pixels of the second set of pixels are each labelled with a "B" and pixels of the third set of pixels are each labelled with an "R". In this example, the colour filter elements of the colour filter array, and hence the pixels of the first, second and third set of pixels, are arranged in a series of repeating groups, in a Bayer pattern. A Bayer pattern, sometimes referred to as a Bayer filter mosaic is a colour filter array pattern for arranging red, green and blue colour filters on a grid of sensor pixels. The Bayer pattern includes repeating groups of one blue filter element, two green filter elements and one red filter elements. Hence, an image obtained from an image sensor 100 with a Bayer pattern of colour filter elements will have pixels which are also arranged in a Bayer pattern (which for example includes repeating groups of one blue pixel, two green pixels and one red pixel). Hence, in this example, each group includes two pixels of the first set of pixels, a pixel of the second set of pixels and a pixel of the third set of pixels.

Referring back to FIG. 2, the data collection process further involves, at item 116, calculating values for sub-blocks in the blocks. Each sub-block is for example a group of the repeating groups of pixels. In this case, each sub-block is therefore a two by two sub-block of pixels, including two pixels of the first set of pixels, a pixel of the second set of pixels and a pixel of the third set of pixels. The pixel of the second set of pixels and the pixel of the third set of pixels may each be adjacent to at least one of the pixels of the first set of pixels. Three sub-blocks are labelled with reference numerals 118a, 118b, 118c in FIG. 3, although it is to be appreciated that the block may include further sub-blocks than those labelled in FIG. 3. The sub-block may be any shape or size and, in some cases, some of the sub-blocks may be a different shape and/or size than others.

The values calculated for a sub-block may considered to be parameter values associated with at least one of the colour channels, which may represent or provide information related to a hue of the sub-block, or another colour appearance parameter for the sub-block. These values may therefore be referred to as hue statistics. A hue for example represents a visual appearance of a colour, and may be defined as the degree to which a stimulus is similar to or different from red, green, blue and yellow stimuli.

In examples, calculating parameter values for a sub-block includes determining whether any of the pixels of the sub-block are saturated. If none of the pixels are saturated, parameter values can be calculated using each of the pixels of the sub-block, for example based on a value of a pixel of the first set of pixels (such as an intensity value), a value of a pixel of the second set of pixels and/or a value of the third set of pixels. In the example of FIG. 3, the parameters are ratios between values of pixels of the sub-block in two different sets of pixels, corresponding to two different colour channels (although other parameters may be calculated in other examples). Hence, the parameter values are values of these ratios. Ratios of R/B, G/B and G/R values may therefore be calculated for green, blue and red pixels, where "RIB" for example represents the ratio between an intensity of a red pixel and an intensity of a blue pixel, "G/B" for example represents the ratio between an intensity of a green pixel and an intensity of a blue pixel, and "G/R" for example represents the ratio between an intensity of a green pixel and an intensity of a red pixel. In these examples, each ratio, R/B, G/B and G/R, corresponds to a different parameter respectively. The ratio R/B may be considered to be associated with the red and blue colour channels, the ratio G/B may be considered to be associated with the green and blue colour channels and the ratio G/R may be considered to be associated with the green and red colour channels.

As will be appreciated, in examples such as FIG. 3, a sub-block 118a, 118b, 118c may include two pixels of the same set of pixels, i.e. two pixels corresponding to the same colour channel. In cases such as this, ratios using values corresponding to this colour channel may be calculated in various different ways. For example, in FIG. 3, each sub-block 118a, 118b, 118c includes two green pixels, which each belong to the first set of pixels. In this case, the G/B and G/R ratios may be calculated by calculating two G/B ratios and two G/R ratios (one for each of the two green pixels) and taking an average. Alternatively, the G/B and G/R ratios may be calculated for a particular sub-block using the green pixel which has the largest (or smallest) intensity value, for example.

In some cases, the parameter values may be calculated where it is determined that the sub-block satisfies at least one quality criterion. For example, the quality criterion may be based on an average intensity of pixels of the sub-block, such as a mean intensity. If the average intensity meets or exceeds a threshold intensity, the parameter values may be calculated. Otherwise, the sub-block may be discarded or not processed further.

Referring back to FIG. 2, a histogram may then be generated at item 120, using the parameter values calculated at item 116. The histogram may include a plurality of bins, each associated with a respective range of parameter values. FIG. 4 shows an example of a histogram 122. The histogram 122 of FIG. 4 is a histogram of the B/R ratio, although in other examples histograms of other parameters, such as other ratios, may instead or additionally be generated as explained further below. Each bin of the histogram 122 corresponds to a different range of values of the ratio B/R.

A histogram such as that of FIG. 4 may be generated iteratively. For example, after calculation of a parameter value for a parameter corresponding to the histogram 122, the bin of the histogram 122 corresponding to the calculated parameter value may be identified. A count of that bin may then be incremented.

In examples, parameter values of other parameters may also be stored for a particular sub-block. For example, in FIG. 4, the parameter stored in the histogram 122 is the B/R ratio. However, values for the G/B and G/R ratios may also be stored. Values of other parameters may also be stored, such as the value for the lowest intensity colour channel (which is for example the colour channel which is least likely to be saturated). Each of the stored values may be associated with the bin of the histogram 122 corresponding to the parameter value of the sub-block in question. If it is identified that a sub-block has a B/R ratio corresponding to the $10^{th}$ bin of the histogram 122, the histogram 122 may be updated to increment the count of the 10th bin, to accumulate the G/B and G/R ratios and to accumulate the value (in this case the intensity value) for the lowest intensity colour channel. This may be summarised for example as:

$$Q_{BR}(10,:)=Q_{BR}(10,:)+[1\% \; G/R \; G/B \; B]$$

where blue is the lowest intensity colour channel, and where $Q_{BR}(10,:)$ represents an entry of the histogram associated with the $10^{th}$ bin.

This procedure may be repeated for each of the sub-blocks of the block 114 for which all pixels are unsaturated, to obtain a distribution of the number of counts of a particular parameter (in this case, the B/R ratio). In this way, the sum of the other parameter values associated with a particular range of B/R ratio values may also be obtained. This allows parameter values associated with this range of B/R ratio values to be retrieved subsequently, for example for saturation correction, as will be explained further below.

In examples, a separate histogram may be stored for each of a plurality of different parameters to provide flexibility for saturation correction. For example, where the image includes three colour channels, three histograms may be created, with one binned in the B/R ratio, one binned in the G/R ratio and the other binned in the G/B ratio. For example, where a particular sub-block has a B/R ratio corresponding to the 10th bin of the histogram 122, the histogram 122 may be updated as described above to increment the count of the $10^{th}$ bin, to accumulate the G/B and G/R ratios and to accumulate the value (in this case the intensity value) for the lowest intensity colour channel for the sub-block. However, for that same sub-block a second histogram for the G/B ratio may also be updated by identifying the bin of the second histogram corresponding to the G/B ratio, incrementing the count of this bin, accumulating the R/B and G/R ratios for the sub-block and accumulating the value of the lowest intensity colour channel. Similarly, a third histogram for the G/R ratio may be updated by identifying the bin of the third histogram corresponding to the G/R ratio for the sub-block, incrementing the count of this bin, accumulating the R/B and G/B ratios for the sub-block and accumulating the value of the lowest intensity colour channel.

After processing the sub-blocks of the block 114 to generate the histogram or histograms, the amount of data stored in the histograms may be relatively large. To reduce storage requirements, the method of FIG. 2 further includes, at item 124, selecting a subset of the plurality of bins of a histogram (such as the histogram 122 of FIG. 4) to store.

Selecting the subset of the plurality of bins may include identifying n of the plurality of bins, each with a larger respective count than a respective count of each of a remainder of the plurality of bins and selecting the n bins as the subset (where n is an integer). This may therefore involve identifying the n most populated bins of the histogram 122, such as the n bins with the highest respective counts. The number of bins within the subset may depend on the storage available as part of an image processing system for implementing the methods described herein. As an illustrative example, the 5 bins with the 5 highest counts may be stored, however other numbers of bins may be stored in other examples.

The counts of the subset of bins are typically stored along with the values for the other parameters corresponding to that bin of the histogram. For example, if the 10th bin of the B/R ratio histogram is identified as being within the subset of bins for storage, the accumulated values of the G/B and G/R ratios and the accumulated value of the intensity of pixels of the blue colour channel associated with the 10th bin of the B/R ratio histogram may also be stored. In examples, though, the average values of the G/B and G/R ratios and the average intensity of the lowest intensity colour channel are stored rather than the accumulated values.

As an illustrative example, for bins m, m+1, m+2, m+3, m+4, m+4 (where m, m+1, m+2, m+3, m+4, m+4 are not necessarily consecutive bins and may not be ordered in bin number), which represent the 5 bins with the highest counts for the entries sorted by B/R ratio, a look-up table may be filled with the following data:

| Bin | Average G/B | Average G/R | Average B |
|---|---|---|---|
| m | $\overline{G/B_m}$ | $\overline{G/R_m}$ | $\overline{B_m}$ |
| m + 1 | $\overline{G/B_{m+1}}$ | $\overline{G/R_{m+1}}$ | $\overline{B_{m+1}}$ |
| m + 2 | $\overline{G/B_{m+2}}$ | $\overline{G/R_{m+2}}$ | $\overline{B_{m+2}}$ |
| m + 3 | $\overline{G/B_{m+3}}$ | $\overline{G/R_{m+3}}$ | $\overline{B_{m+3}}$ |
| m + 4 | $\overline{G/B_{m+4}}$ | $\overline{G/R_{m+4}}$ | $\overline{B_{m+4}}$ | where $\overline{G/B_m}$ represents the average G/B ratio value for sub-blocks with a B/R ratio value falling within the mth bin, $\overline{G/B_m}$ represents the average G/R ratio value for sub-blocks with a B/R ratio value falling within the mth bin and $\overline{B_m}$ represents the average B value for sub-blocks with a B/R ratio value falling within the mth bin.

Similar look-up tables may be generated for the G/B and G/R ratios. For the look-up table corresponding to the G/B ratio, the average B/R and G/R ratios may be stored instead of the average G/B and G/R ratios. Similarly, for the look-up table corresponding to the G/R ratio, the average B/R and G/B ratios may be stored instead of the average G/B and G/R ratios.

In examples in which a plurality of histograms are generated, such as a histogram corresponding to each of a plurality of different parameters, a subset of bins from each histogram may be selected for storage, to further reduce storage requirements.

As explained above, the values selected for storage may be stored in a look-up table or other data format providing for retrieval of particular values. In this way, these values may be obtained subsequently as part of a saturation correction process, as described below.

In the above-described example, none of the pixels of the sub-block are saturated. This allows parameter values to be calculated using each of the pixels of the sub-block. However, in some cases, at least one of the pixels of the sub-block may be saturated. In these cases, the parameters associated with the colour channel which a saturated pixel is associated with may provide limited information about the hue of the sub-block, as the values of these parameters are likely to be restricted due to the saturated pixel having an intensity value exceeding a maximum intensity value measureable by the image sensor. In view of this, the method may instead involve calculating a ratio between any pixels of the sub-block which are not saturated.

For example, if the two green pixels of a sub-block are both saturated, the B/R ratio may be calculated and the value of the lowest intensity colour channel may be calculated if the lowest intensity colour channel is the blue or red colour channel A calculation of the G/B and G/R ratios may be omitted, and G/B and G/R histograms may not be updated. In this case, the B/R ratio histogram may be updated to increment the count of the bin in which the calculated B/R ratio lies and to accumulate the B value associated with this bin. The G/B and G/R ratios associated with this bin of the B/R ratio histogram may not be incremented (or may be incremented with a value of zero).

In further examples, two of the colour channels of a sub-block may be saturated. In such cases, a ratio between values of two different colour channels may provide limited information, as at least one of the values for the value is a saturated value. In such cases, a histogram of the intensity of unsaturated pixels of sub-blocks of the block may instead be generated. For example, a separate intensity histogram may be generated for each colour channel. In such cases, a look-up table may be generated as described above, but storing the average intensity value for the n bins of the histogram with the highest average intensity value, for example for each colour channel, rather than ratio values (or by storing null or zero values for the ratio values in addition to the average intensity value with a non-zero value for these n bins).

By obtaining values for parameters for which unsaturated pixels are available, the hue information obtained from the block may be increased.

In some cases, a sub-block may not include any unsaturated pixels. In these cases, no information may be stored for the sub-block. Alternatively, different parameters may be stored for these sub-blocks, which may be referred to as saturated sub-blocks. For example, the average intensity value for each colour channel (or for a subset of colour channels) may be stored for such sub-blocks. A histogram of the intensity value for each or a subset of the colour channels may also be generated for such sub-blocks. All or a subset of the bins of this histogram may be stored and used subsequently.

Figure 5:
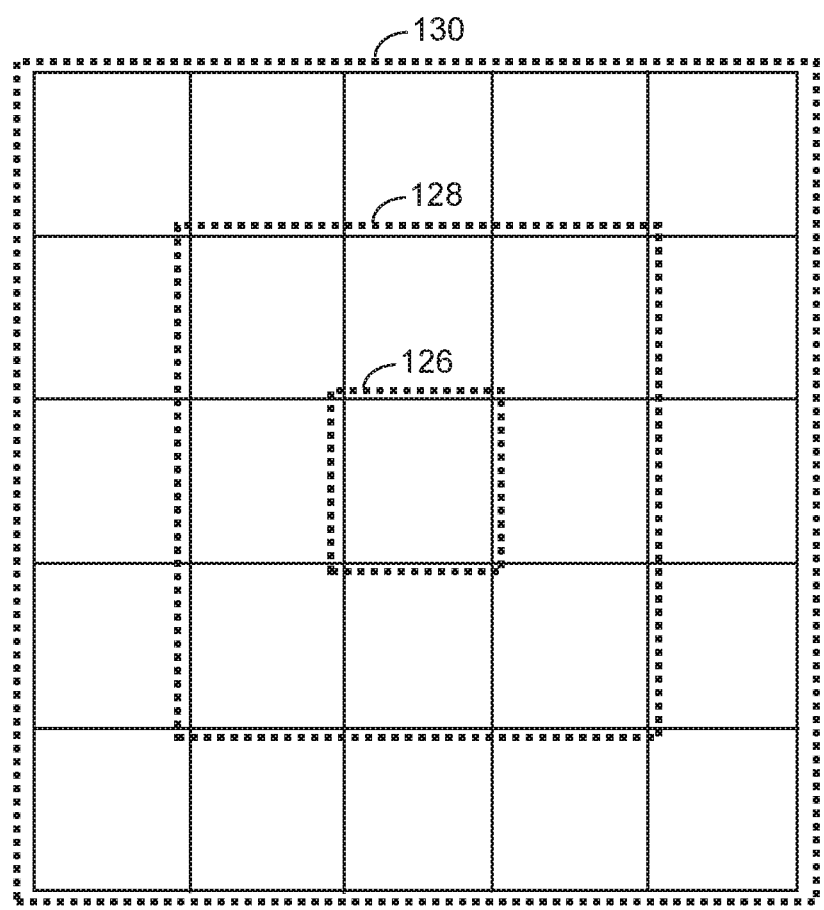
FIG. 5 illustrates schematically an example method of collecting data for a saturated block of an image.

In examples in which a block includes at least one sub-block with at least one unsaturated pixel, the data may be collected as described above. However, in other examples, all of the sub-blocks may be saturated sub-blocks. This may be the case where the block corresponds to a particularly bright part of a scene. In such cases, data for the block may be obtained based on other regions of the image, such as other blocks. FIG. 5 shows an example of this.

In FIG. 5, a block 126 is a saturated block, which does not include an unsaturated sub-block. In other words, all of the pixels of the block 126 are saturated pixels. To obtain data representative of a hue of the block 126, a method in accordance with FIG. 5 may involve processing data for neighbouring blocks 128 of the block 126, to determine whether the neighbouring blocks 128 are sufficiently similar in hue to the block 126. For example, the data for a neighbouring block of the neighbouring blocks 128 may be data representative of an average intensity of the neighbouring block for some or all of the colour channels. This may be compared with the average intensity of the corresponding colour channel of the block 126. The data for the neighbouring block with the most similar intensity value to the block 126 may be used subsequently as data representative of the block 126. This may be the case if for example a difference between the average intensity of a given colour channel for the block 126 and the neighbouring block meets or is less than a threshold difference, suggesting that the block 126 and the neighbouring block represent similar hued areas of the image. Otherwise, data for an increasing number of blocks, such as blocks 130 that are separated from the block 126 by one of the neighbouring blocks 128, may be processed to identify whether any of these blocks 130 are sufficiently similar in hue to the block 126 to use the data for these blocks 130 in place of the missing data for the block 126. This process may be increased with a gradually increasing look-up region until suitable data has been identified to represent the block 126 or until the look-up region meets or exceeds a predetermined size. If the look-up region meets or exceeds a predetermined size (such as a size which may no longer be considered to be local to the block 126 and therefore unlikely to accurately represent the hue of the block 126), default data may be used to represent the block 126. For example, the default data may be representative of parameter values corresponding to a grey or white region of an image.

Saturation Correction—One Pixel Saturated

After obtaining the data for the blocks of the image, for example as described with reference to FIGS. 2 to 5, a saturation correction process may be performed. An example of a saturation correction process is described with reference to FIGS. 6 and 7 for examples in which one pixel of a first image region is saturated.

Figure 6:
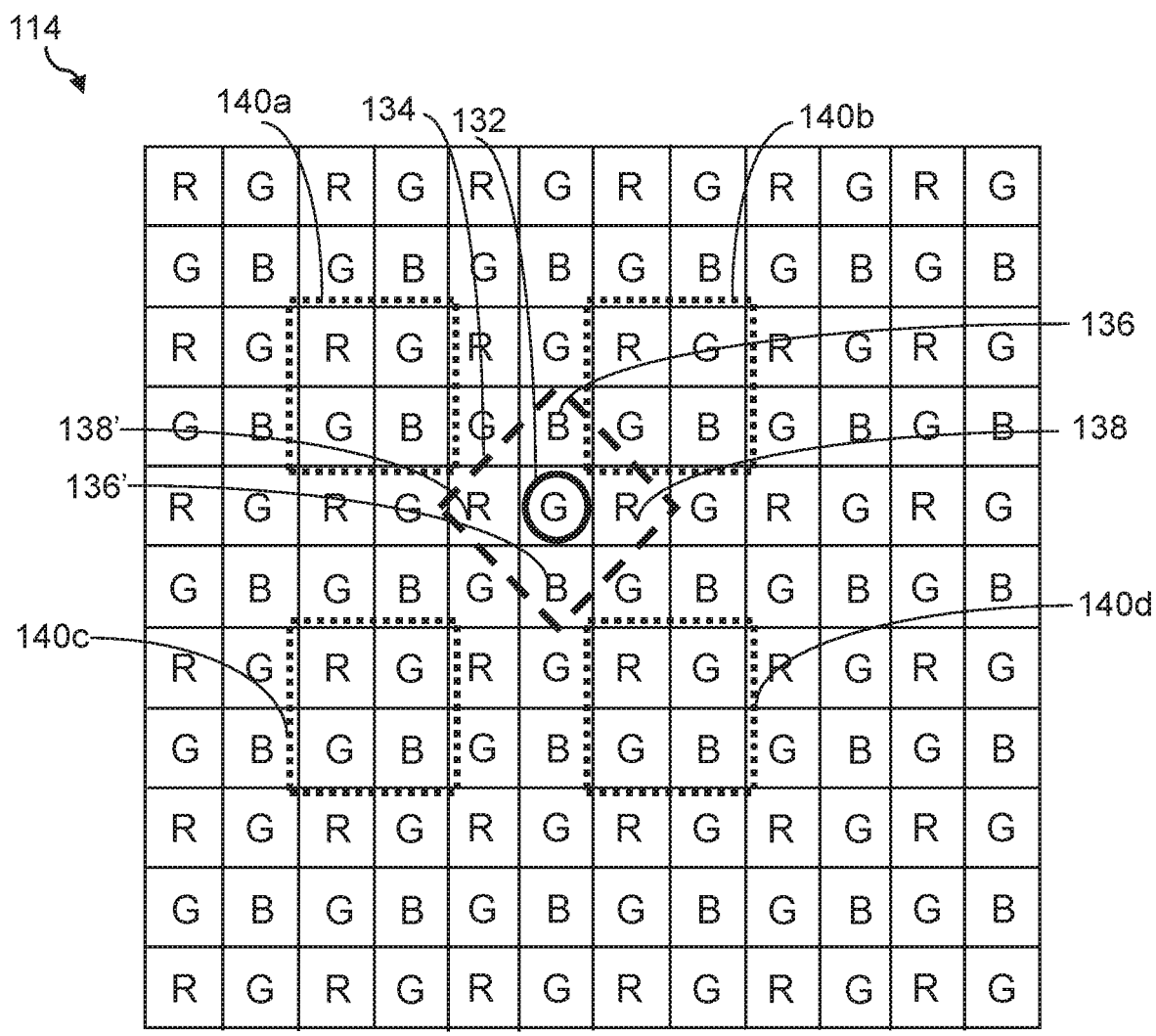
FIG. 6 illustrates schematically the generation of output data according to examples in which one pixel of a first image region is saturated.

FIG. 6 shows the block 114 of the image shown in FIG. 3, from which data was collected as described in FIGS. 2 to 5. The block 114 includes a first pixel 132 of the first set of pixels, which is a saturated pixel. For example, image data representative of at least a portion of the image, such as image data representative of the block 114 or representative of a plurality of blocks (including the block 114), may be processed as part of the saturation correction process. A portion of the image data representative of the first pixel 132 of the first set of pixels may be processed to determine that the first pixel 132 of the first set of pixels is a saturated pixel. The processing may include comparing intensity values of the first pixel 132 of the first set of pixels with a maximum intensity value which intensity values may be set to or limited to if the intensity exceeds the maximum intensity the image sensor is capable of detecting. Processing of other portions of the image data representative of other pixels may be performed to identify which pixels of the block 114 are saturation. This may be performed separately for pixels associated with different respective colour channels. For example, the image data may be processed to identify pixels of the first, second and third set of pixels which are saturated.

The first pixel 132 of the first set of pixels is within a first image region 134 in FIG. 6. The first image region 134 of FIG. 6 also includes a first pixel 136 of the second set of pixels. The first image region 134 in this example also includes a first pixel 138 of the third set of pixels. However, in other examples, the first image region 134 may not include the first pixel 138 of the third set of pixels. Similarly, while in FIG. 6, the first image region 134 includes a further first pixel of the second and third set of pixels 136', 138', in other examples the first image region 134 may not include these further pixels. The first image region 134 may be considered to be an image region which surrounds or includes the first pixel 132. The first image region 134 may therefore be considered to be an area or region of the image that is local to the first pixel 132 and which may therefore be representative of a hue in a neighbourhood or vicinity of the first pixel 132. The first image region 134 may include at least one pixel which is adjacent to or next to the first pixel 132, without another pixel in between. For example, where the first pixel 132 belongs to a group of a repeating pattern of groups (such as a Bayer group of two by two pixels), the first image region 134 may include at least one pixel of the group including the first pixel 132.

In examples, a number of saturated pixels within the first image region 134 is determined. The processing to be applied to correct for the saturation of the first pixel 132 may depend on the number of saturated pixels within the first image region 134.

In the example of FIG. 6, the first pixel 132 is the only saturated pixel within the first image region 134; the other pixels 136, 138, 136', 138' of the first image region 134 are unsaturated. The first image region 134 may therefore be considered to be a region for which a single colour channel (the green colour channel) is clipped or saturated.

First data based on a value of the first pixel 136 of the second set of pixels may then be obtained. In the example of FIG. 6, as the first pixels 136, 138 of both the second and third sets of pixels are unsaturated, the first data is based on the values of the first pixels 136, 138 of both the second and third sets of pixels. However, in other examples (as described later), the first data may be solely based on the value of the first pixel 136 of the second set of pixels.

Methods such as this may involve identifying, within the first image region 134, an unsaturated pixel of the second set of pixels and using the unsaturated pixel of the second set of pixels as the first pixel 136 of the second set of pixels. For example, if the first pixel 136 and the further first pixel 136' of the second set of pixels are both identified as being unsaturated, either of these pixels may be used as the first pixel 136 of the second set of pixels. However, if one of these pixels is unsaturated and the other is saturated, the unsaturated one of these pixels may be selected as the first pixel of the second set of pixels.

The first data may for example represent a first parameter value of a first parameter for the first image region 134, which may be associated with the second colour channel. In the example in which the first pixel 134 is the only saturated pixel within the first image region 134, the first parameter is for example a first ratio between the value of the first pixel of the second set of pixels 136 and the value of the first pixel of the third set of pixels 138, which may be represented as B/R. Other first parameters are possible in other examples, though, such as other parameters representative of a hue of the first image region 134. The use of the first ratio as the first parameter may be based on a determination that the first pixel of the second set of pixels and the first pixel of the third set of pixels are unsaturated pixels. In other examples, the first parameter may represent a different characteristic of the first image region 134.

As explained above, in the example of FIG. 6, the first pixels 136, 138, 136', 138' are all unsaturated pixels. There are therefore a number of possible ways of calculating the first ratio for the first image region 134. For example, the first ratio may be calculated as: the ratio between the intensity values for the first pixel 136 of the second set to the first pixel 138 of the third set; the ratio between the intensity values for the first pixel 136 of the second set to the further first pixel 138' of the third set; the ratio between the intensity values for the further first pixel 136' of the second set to the first pixel 138 of the third set; the ratio between the intensity values for the further first pixel 136' of the second set to the further first pixel 138' of the third set; the ratio between the sum of the intensity values for the first and further first pixels 136, 136' of the second set to the sum of the intensity values for the first and further first pixels 138, 138' of the third set; or an average between any of these ratios. In an example, a sum of the intensity values for each possible pair of pixels (with one pixel belonging to the second set and the other belonging to the third set) is calculated and the first ratio is taken as the ratio between the intensity value of the pixel of the second set to the pixel of the third set for the pair of pixels with the largest sum.

Based on the first data, second data based on a value of a second pixel of the first set of pixels and a value of a second pixel of the second set of pixels may be obtained based on the first data, for a second image region. The second image region includes the second pixel of the first set of pixels and the second pixel of the second set of pixels. In the example of FIG. 6, the second image region corresponds to the block 114 and the second data is based on the previously collected data representative of the block 114. The data representative of the block 114 may be collected as described above with reference to FIGS. 2 to 5. The data may be stored in a look-up table, as explained above.

In examples such as this, the second data may be retrieved from the look-up table based on the first data. For example, where the first data represents the first ratio (which in the example of FIG. 6 is the B/R ratio for the first image region 134), the look-up table may be queried to identify an entry corresponding to the first ratio. For example, the look-up table may include entries corresponding to a respective first parameter value of a set of first parameter values of the first parameter for the second image region 114 (where the first parameter is for example the first ratio). In other words, the look-up table may have been created based on the second image region 114, such as based on values for respective pixels of the second image region 114. Each entry of the look-up table may for example correspond with a bin of a histogram for the first ratio, such that each entry corresponds to a particular range of values for the first ratio. The second data may be retrieved from the look-up table by identifying an entry of the look-up table which corresponds to one of the set of first parameter values with a closest value for the first parameter value represented by the first data.

As explained above, the look-up table may have been generated by generating, for the second image region, a histogram including a plurality of bins, each associated with a respective range of first parameter values. A subset of the plurality of bins, each corresponding to a respective a respective entry of the entries may be selected from the histogram. For each of the subset of the plurality of bins, a corresponding second parameter value of a second parameter associated with the first colour channel may be stored as part of a respective entry corresponding to the respective bin of the subset of the plurality of bins. Hence, the look-up table may include a subset of ranges of values for the first parameter rather than all possible ranges of values. For example, the look-up table may include a first entry corresponding to a first range of values for the first parameter and a second entry corresponding to a second range of values for the first parameter which is discontinuous with the first range of values, such as with a gap between the first and second ranges of values. If the first ratio for the first image region 134 has a value which lies in the gap between the first and second ranges of values, either the first entry or the second entry may be retrieved for example depending on whether the value of the first ratio is closer to the first or the second range of values. In other examples, though, the first ratio may lie within the first range or the second range. In such cases, the first entry or the second entry may be retrieved, respectively.

The first ratio may be considered to be representative of a hue characteristic of a local area which surrounds or is adjacent to the first pixel 132, which is saturated. Hence, data from the look-up table with a first parameter value which is similar to the value of the first ratio for the first image region 134 may represent image portions with similar hue characteristics to the first image region 134. This may improve the accuracy of the saturation correction process.

The look-up table for example includes entries corresponding to ranges of values of the first ratio (which may be considered to correspond to the first parameter in examples). The first ratio in this example is B/R. However, the look-up table in examples also includes other values associated with each B/R entry (corresponding to each bin of the histogram upon which the look-up table is based). For example, the look-up table may include a second parameter associated with the first colour channel, such as the G/B or G/R ratios discussed above. In such cases, a second parameter value of the second parameter may be retrieved from the look-up table as the second data. For example, the second parameter value may be associated with one of the set of first parameter values, and may be based on the value of a second pixel of the first set of pixels and a value of at least one of a second pixel of the second or third set of pixels. For example, the second parameter value may represent a ratio between the value of the second pixel of the first set of pixels and the value of the second pixel of the second set of pixels (such as the G/B ratio, and which may be referred to as a second ratio) or a ratio between the value of the second pixel of the first set of pixels and the value of the second pixel of the third set of pixels (such as the G/R ratio, and which may be referred to as a third ratio).

As will be appreciated, the G/B and G/R ratios may be average ratios for sub-blocks of the block 114 with a B/R ratio which falls within a range of values of the look-up table which is closest to the B/R ratio calculated for the first image region 134. The second pixels of the first, second and third set of pixels may therefore be pixels of any of these sub-blocks used to obtain the G/B and/or G/R ratios.

As described above, the look-up table may be generated for the second image region (such as the block 114) based on a respective value for each of a plurality of pixels of the first set of pixels within the second image region and based on a respective value for each of a plurality of pixels of the second set of pixels within the second image region. Each of the plurality of pixels of the first and/or second sets of pixels may be an unsaturated pixel, respectively. For example, the G/B and/or G/R ratios may be obtained for one or more unsaturated sub-blocks, which do not include a saturated pixel. The method may therefore include identifying, within the second image region, an unsaturated pixel of the first set of pixels and an unsaturated pixel of the second set of pixels, using the unsaturated pixel of the first set of pixels as the second pixel of the first set of pixels and using the unsaturated pixel of the second set of pixels as the second pixel of the second set of pixels.

After obtaining the second data, the second data may be processed to generate output data representative of an estimated value associated with the first colour channel for the first pixel 132 of the first set of pixels. Hence, the estimated value may be obtained based on second data retrieved from a look-up table, which may be representative of hue characteristics of the block 114 including the first pixel 132. In this way, methods such as this may exploit a correlation between a hue of unsaturated areas of an image (in this example, unsaturated pixels of the second image region, which corresponds to the block 114) to extrapolate a value for the first pixel 132, which is a saturated pixel. The second data for example represents a statistical measure of the hue characteristics of the second image region. The dynamic range of the image may therefore be extended beyond that of the image sensor 100.

In other examples, such as that of FIG. 6, the method may further include obtaining further data for at least one further image region. In FIG. 6, further data is obtained for four further image regions 140*a*, 140*b*, 140*c*, 140*d* (collectively referred to with the reference numeral 140). However, in other examples, further data may be obtained for more or fewer than four image regions. Furthermore, while in FIG. 6 the four further image regions 140*a*, 140*b*, 140*c*, 140*d* do not adjoin each other, in other examples at least some of the further image regions may adjoin each other and may therefore form a continuous image region. A further image region typically includes at least one further pixel of the first set of pixels and at least one further pixel of the second set of pixels and may also include at least one further pixel of the third set of pixels. The further data is for example based on a respective value of the at least one further pixel of the further set of pixels and the at least one further pixel of the second set of pixels, and may also be based on a respective value of the at least one further pixel of the third set of pixels.

A further image region for which the further data is obtained may be smaller than the second image region upon which the second data is based. For example, the second data may be considered to represent a more general hue characteristic of a larger image portion including the first pixel 132, whereas the further data (based on the further image region) may represent a more localized hue characteristic of a smaller image portion which is more local to the first pixel 132. For example, the second image region may be a predetermined image region of a predetermined size (such as the block 114 of FIG. 6), whereas the further image region may not have a fixed or predetermined size but may nevertheless be smaller than the second image region. The further image region may be within the second image region and may therefore represent a sub-portion of the second image region. The second data may be processed with the further data to generate the output data so that the output data accounts for hue characteristics on both a shorter and a longer distance scale within the image. The second data may therefore be considered to represent collected statistics representative of a block of the image and the further data may be considered to represent local statistics.

The second data may be obtained from a look-up table as described above. The further data may also be obtained from a look-up table (such as a look-up table for a smaller image region than the second image region). However, in examples such as that of FIG. 6, the further data may be obtained from the image data rather than from a look-up table.

The further data may be obtained for at least one further pixel of the first set of pixels closest to the first pixel 132 of the first set of pixels and for at least one further pixel of the second set of pixels closest to the first pixel 132 of the first set of pixels. In other words, the further data may be obtained for pixels which are closest to, adjacent or neighbouring the first pixel 132 of the first set of pixels, or which are within a predetermined distance from the first pixel 132 of the first set of pixels. In the example of FIG. 6, the further image regions 140*a*, 140*b*, 140*c*, 140*d* each correspond to a group of four pixels, respectively, where the block 114 of FIG. 6 includes repeating groups of four pixels. For example, each further image region may be a sub-block such as the sub-blocks 118*a*, 118*b*, 118*c* illustrated in FIG. 3. As can be seen from FIG. 6, the further image regions 140*a*, 140*b*, 140*c*, 140*d* are each adjacent to a group of four pixels including the first pixel 132 of the first group of pixels.

To obtain the further data, the method may involve identifying, within the further image region, at least one unsaturated pixel of the first set of pixels and at least one unsaturated pixel of the second set of pixels. The at least one unsaturated pixel of the first and second sets of pixels may be used as the at least one further pixel of the first and second sets of pixels, respectively. Similarly, the method may involve identifying at least one unsaturated pixel of the third set of pixels and using the at least one unsaturated pixel of the third set of pixels. For example, in FIG. 6, there are four other groups of four pixels adjacent to the group of pixels including the first pixel 132. However, in this example, each of these other groups includes a saturated pixel of the first set of pixels and/or a saturated pixel of the second set of pixels. Hence, these other groups are not used to calculate the further data in this example.

A first parameter value of the first parameter (which is for example used to obtain the second data from the look-up table as described above), may be calculated for the further image regions 140. For example, where the first parameter is the B/R ratio, the value of the B/R ratio may be calculated for each of the further image regions 140 of FIG. 6 (as, in this case, it has been determined that none of the pixels of the further image regions 140 are saturated). A second parameter value of the second parameter (which is for example the G/B ratio or the G/R ratio) may also be calculated for the further image regions 140. In examples such as this, the second data may represent a second parameter value of the second parameter for the second image region (the block 114 in the example of FIG. 6) and the further data may represent a second parameter value of the second parameter for a further image region (such as one of the further image regions 140 of FIG. 6). The processing of the second data with the further data to generate the output data may include performing a weighted sum of the second parameter values for the second image region and the further image region. In this way, the collected statistics may be merged with the local statistics. This is shown schematically in FIG. 7.

Figure 7:
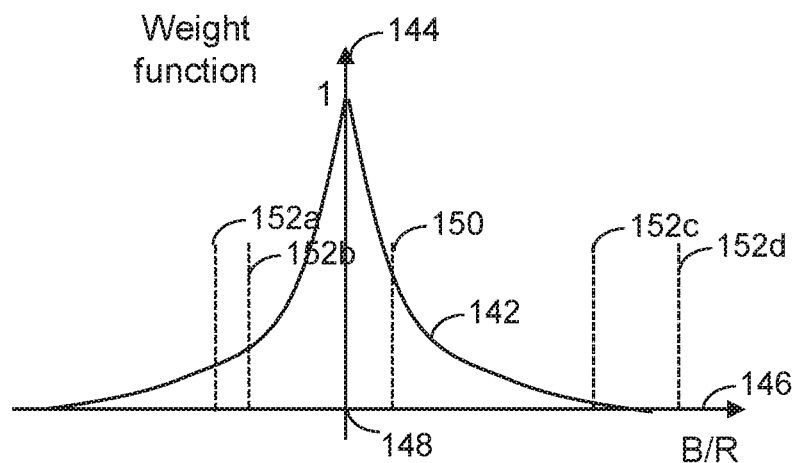
FIG. 7 illustrates schematically an example of weighting at least two parameter values according to examples in which one pixel of a first image region is saturated.

FIG. 7 shows an example variation of a weight function 142 in dependence on the value of the first parameter (which in this example is the first ratio, B/R). The y-axis 144 indicates the value of the weight function 142 and the x-axis 146 indicates the value of the B/R ratio. The weight function 142 takes its largest value (of 1) at a B/R value represented by the first data 148, which in this example is the first ratio (B/R) calculated for the first image region 134 of FIG. 6. This may be referred to as $B/R_{actual}$—The B/R value corresponding to the second data 150 is also illustrated in FIG. 7, and may be referred to as $B/R_{lookup}$ as the second data 150 may be obtained from a look-up table as described above. $B/R_{lookup}$ is for example the B/R value of the look-up table which is closest to $B/R_{actual}$. Similarly, the B/R values represented by each of the fourth sets of further data 152*a*, 152*b*, 152*c*, 152*d* are also illustrated in FIG. 7, and may be referred to as $B/R_{adjacent}$. $B/R_{adjacent}$ therefore represent B/R values for adjacent groups of pixels to the group of pixels including the first pixel 132 of the first set of pixels. A respective weight value may be obtained for each of the B/R values shown in FIG. 7.

Subsequently, the second parameter values for sub-blocks (or image regions) corresponding to the first parameter values obtained from the look-up table and for each of the further image regions may be obtained. A weighted sum of these second parameter values may then be performed to obtain an estimated value for the first pixel 132 of the first set of pixels. For example, a weighted sum $S_1$, may be performed as:

$$S_1 = W_{B/R_{adjacent1}} \left(\frac{G}{B}\right)_{adjacent\ 1} + \\ W_{B/R_{adjacent2}} \left(\frac{G}{B}\right)_{adjacent\ 2} + W_{B/R_{adjacent3}} \left(\frac{G}{B}\right)_{adjacent\ 3} + \\ W_{B/R_{adjacent4}} \left(\frac{G}{B}\right)_{adjacent\ 4} + W_{B/R_{lookup}} \left(\frac{G}{B}\right)_{lookup}$$

where w represents a weight obtained from the weight function 142, the subscripts "adjacent 1", "adjacent 2", "adjacent 3", "adjacent 4" indicate that the value to which the subscript is attached is obtained based on the further image regions 140a, 140b, 140c, 140d respectively (for example from the further data), the subscript "lookup" indicates that the value to which this subscript is attached is obtained based on the second image region (for example from the second data). In this example, it is to be appreciated that the right side of the expression for the weighted sum $S_1$ may be normalized, for example by division by the sum of the weights.

A similar weighted sum $S_2$ may be obtained for a different second parameter, based on G/R rather than G/B, for example as:

$$S_2 = W_{B/R_{adjacent1}} \left(\frac{G}{R}\right)_{adjacent\ 1} + \\ W_{B/R_{adjacent2}} \left(\frac{G}{R}\right)_{adjacent\ 2} + W_{B/R_{adjacent3}} \left(\frac{G}{R}\right)_{adjacent\ 3} + \\ W_{B/R_{adjacent4}} \left(\frac{G}{R}\right)_{adjacent\ 4} + W_{B/R_{lookup}} \left(\frac{G}{R}\right)_{lookup}$$

As for the expression for the weighted sum $S_1$, it is to be appreciated that the right side of the expression for the weighted sum $S_2$ may also be normalized, for example by division by the sum of the weights.

In this way, two different weighted sum values may be obtained: one based on the G/B ratio and the other based on the G/R ratio (although in some cases solely one of these weighted sums may be calculated). These weighted sum values may be considered to correspond to an estimate of the second parameter value for the first image region 134. From this, an estimated value of the first pixel 132 may be obtained based on the first pixel of the second set of pixels and/or the first pixel of the third set of pixels (which are within the first image region 134).

For example, based on the weighted sum $S_1$ a first estimate of the intensity value of the first pixel 132, $G_1$, may be obtained as:

$$G_1 = S_1 B_1$$

where $B_1$ represents the intensity value of the first pixel of the second set of pixels within the first image region 134 (such as the first pixel 136 or the further first pixel 136', or an average intensity value of both of these pixels).

Similarly, a second estimate of the intensity value of the first pixel 132, $G_2$, may be obtained from the weighted sum $S_2$ as:

$$G_2 = S_2 R_2$$

where $R_2$ represents the intensity value of the first pixel of the third set of pixels within the first image region 134 (such as the first pixel 138 or the further first pixel 138', or an average intensity value of both of these pixels).

Finally, the estimated value of the first pixel 132 may be taken as the largest of $G_1$ or $G_2$ or a combination of $G_1$ and $G_2$, such as an average. The estimated value of the first pixel 132 may be represented by output data. The image data received initially may be updated based on the output data so that the updated image represents the image after saturation correction.

The saturation correction process may be performed for each or a subset of saturated pixels of the image. Further processing may then may applied to the image. For example, a renormalization process 106 may be applied to the image after correcting for saturation in this way.

The estimated value of the first pixel 132 may be larger than a saturated value of the first pixel 132, which may for example be limited to a predetermined maximum value. This may therefore increase the range of intensity values represented by the updated image data beyond a predetermined range subsequent image processing operations are arranged to accept. For example, further image processing operations may be based on an assumption that intensity values of a pixel are within a range from 0 to 1. However, the estimated value of the first pixel 132 may have an intensity value of larger than 1.

In cases such as this, the renormalization process 106 may be performed to rescale the estimated value so that it is within an accepted range of intensity values. For example, if after the saturation correction process is applied to the image, the largest intensity value is x, where x is larger than 1, so that the intensity range of the image is from 0 to x, the renormalization process may involve applying a mapping function to the intensity values of the pixels of the image so that, after renormalization, the intensity range of the renormalized image is from 0 to 1.

In other examples, such as examples in which subsequent image processing does not require intensity values of an image to be within a predetermined range, or where the intensity values after saturation correction are within an accepted or predetermined range, the renormalization process 106 may be omitted.

Saturation Correction—Two Pixels Saturated

As explained above, in some cases, more than one pixel of the first image region may be a saturated pixel. In these cases, different parameters than ratios may be used as the first and second parameters. An example such as this will now be described with reference to FIGS. 8 and 9. Features of FIGS. 8 and 9 similar to corresponding features of FIGS. 6 and 7 are labelled with the same reference numeral incremented by 100; corresponding descriptions are to be taken to apply.

Figure 8:
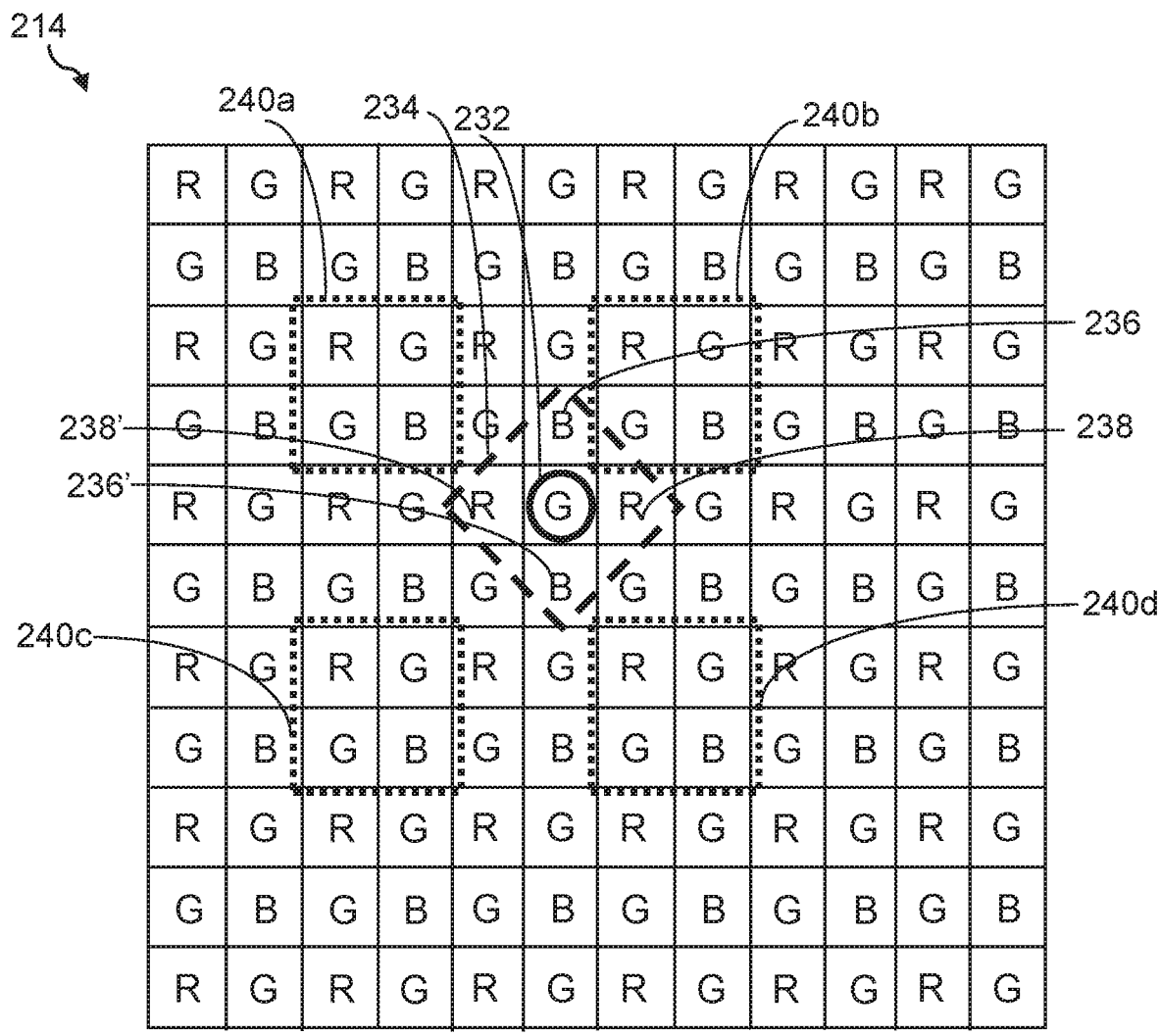
FIG. 8 illustrates schematically the generation of output data according to examples in which two pixels of a first image region are saturated.
Figure 9:
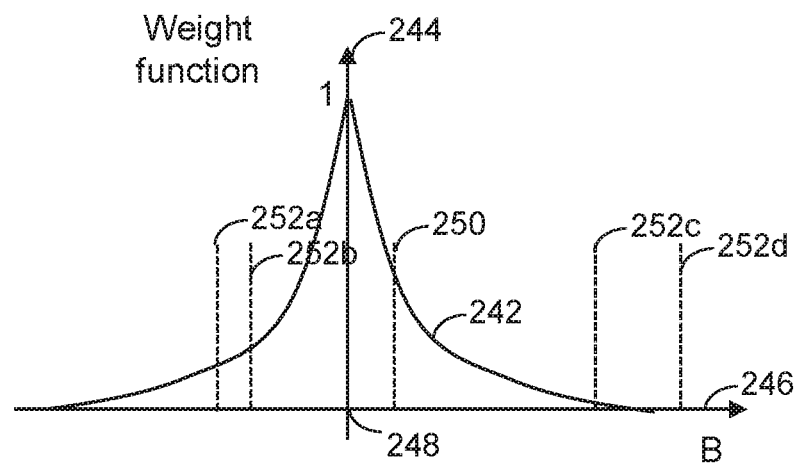
FIG. 9 illustrates schematically an example of weighting at least two parameter values according to examples in which two pixels of a first image region are saturated.

FIG. 8 illustrates a first image region 234 which includes a first pixel 232 of a first set of pixels, which is a saturated pixel. The first image region 234 also includes a first pixel and a further first pixel of the second set of pixels 236, 236' and a first pixel and a further first pixel of the third set of pixels 238, 238'.

In the example of FIG. 8, it is determined that the first pixel of the second set of pixels 236 is an unsaturated pixel and that the first pixel and the further first pixel 238, 238' of the third set of pixels are saturated pixels. In other words, in the first image region 234, which represents a local region including the first pixel 232 of the first set of pixels, only includes unsaturated pixels for one colour channel (the second colour channel).

Based on this determination, in this example the first data is used to represent an intensity value of the first pixel 236 of the second set of pixels rather than a first ratio between the intensity value of the first pixel of the second set of pixels and the first pixel of the third set of pixels. In other words, in these examples, the first parameter may be the intensity value of the first pixel of the second set of pixels 236, which may be represented by the first data. As explained above with reference to FIG. 6, the intensity value of the first pixel 236 or the further first pixel 236' or a combination of the first pixel 236 and the further first pixel 236' (such as an average) may be used as the first parameter value of the first parameter.

Other than using an intensity value based on at least one first pixel of the second set of pixels 236 as the first parameter value, rather than the value of the first ratio, the calculation of the estimated value for the first pixel 232 may be similar to the method described above with reference to FIGS. 6 and 7.

For example, second data associated with a first parameter value of the first parameter (in this case with the intensity value for the first image region 234) may be obtained from a look-up table as described above. Similarly, further data for at least one further image region (in this example four further image regions 240a, 240b, 240c, 240d) may be obtained from the image data. It is to be appreciated that, while the first image region 234 may only include one unsaturated or unclipped colour channel (in this case, the second colour channel), other image regions may include more than one unsaturated or unclipped colour channel. For example, all (or more than one) of the pixels of each of the further image regions 240a, 240b, 240c, 240d may be unsaturated pixels. Similarly, the second data obtained from the look-up table may be based on unsaturated pixels in more than one colour channel. In this way, it may be possible to obtain ratios between two of the colour channels (such as between the first colour channel and one or both of the second and third colour channels) for these other image regions. In this way, the estimated value of the first pixel 232 may be based on colour information in more colour channels than available in the first image region 234, such as within the further image regions and/or the second image region.

The second data and the further data may be weighted in a similar way to the weighting of the second data and the further data illustrated in FIG. 7. The weighting of the second data and the further data is shown schematically in FIG. 9. In this case, as the first parameter represents an intensity value of the second colour channel (in this case the intensity value of the blue colour channel), the weighting applied to obtained values of the second parameter depends on the intensity value of the second colour channel for a particular sub-block or image region rather than on a B/R ratio value.

For example, a weighted sum $S_1$, may be performed as:

$$S_1 = W_{B_{adjacent1}}\left(\frac{G}{B}\right)_{adjacent\,1} + W_{B_{adjacent2}}\left(\frac{G}{B}\right)_{adjacent\,2} + W_{B_{adjacent3}}\left(\frac{G}{B}\right)_{adjacent\,3} + W_{B_{adjacent4}}\left(\frac{G}{B}\right)_{adjacent\,4} + W_{B_{lookup}}\left(\frac{G}{B}\right)_{lookup}$$

As explained above, it is to be appreciated that the right side of the expression for the weighted sum $S_1$ may be normalized, for example by division by the sum of the weights.

In this case, a second weighted sum, $S_2$, may not be calculated, as the first pixel and the further first pixel of the third set of pixels 238, 238' are both saturated in this example. Hence, in this example, the estimated value of the intensity of the first pixel 232, $G_1$, may be obtained as:

$$G_1 = S_1 B_1$$

where $B_1$ represents the intensity value of the first pixel of the second set of pixels within the first image region 234 (such as the first pixel 236 or the further first pixel 236', or an average intensity value of both of these pixels). The estimated value of the first pixel 132 may be represented by output data. The image data received initially may be updated based on the output data so that the updated image represents the image after saturation correction.

Further processing may then be applied to the updated image, such as renormalization, as described above.

Saturation Correction—Three Pixels Saturated

In further examples, pixels of all three colour channels of the first image region may be saturated. In such cases, the values of these pixels may be set to a predetermined maximum, which may be larger than the saturated values of these pixels. These pixels may then undergo a renormalization process such as that described above, to map the intensity range of the renormalized image from 0 to x to 0 to 1. In such cases, bright parts of an image typically remain bright as it is not typically possible to reliably estimate what the colour in such parts of the image should be.

Image Processing System

Figure 10:
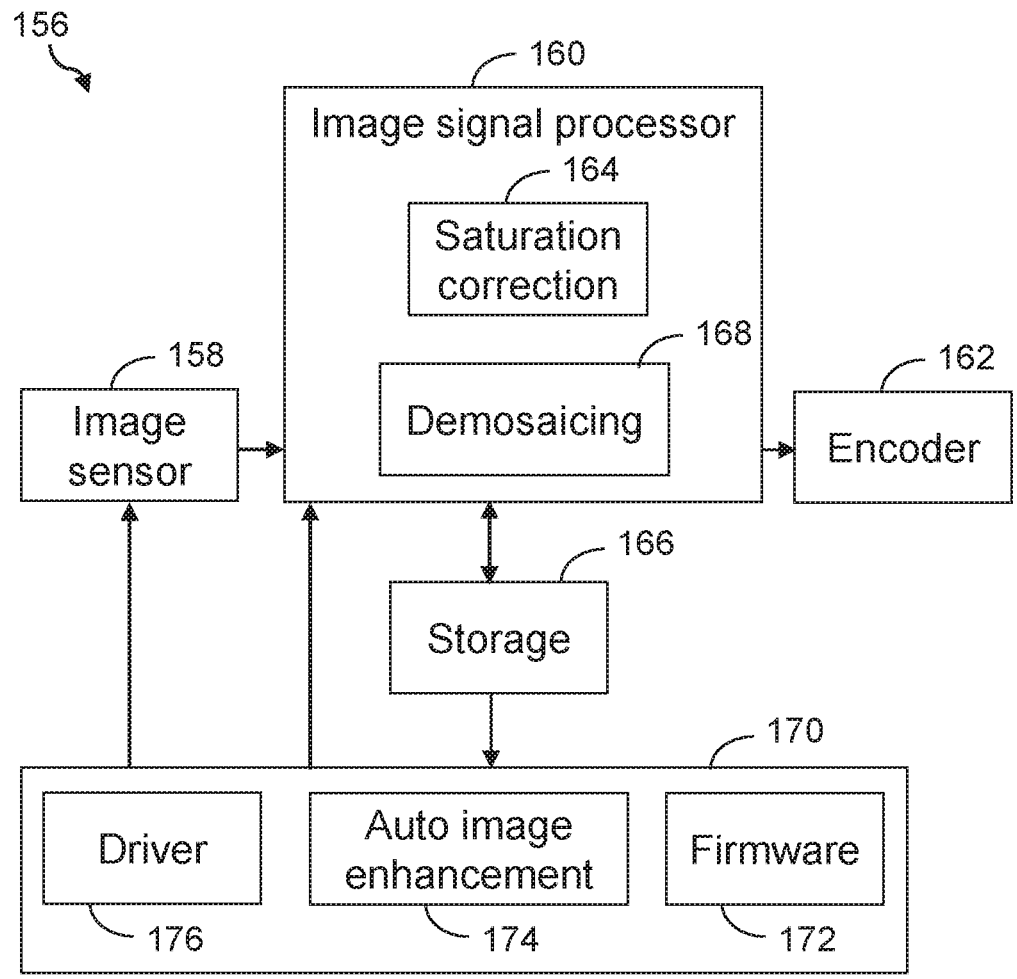
FIG. 10 illustrates schematically components of an image processing system according to examples.

The examples described herein may be implemented using an image processing system 156 such as that illustrated schematically in FIG. 10.

The image processing system 156 of FIG. 10 includes an image sensor 158, such as those described above. Light received at the image sensor 158 is converted to image data. The image data is transferred to an image signal processor 160, which is typically configured to generate output image data representative of at least part of an output image. The output image data may be encoded via an encoder 162 before being transferred to other components (not shown in FIG. 10), for example for storage or further processing. The image signal processor 160 typically includes a number of modules or units that are configured to perform various processing on the image data, to generate the output image data. Image signal processors such as the image signal processor 160 of FIG. 10 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The image signal processor 160 in the example of FIG. 10 is arranged to perform a saturation correction process such as that described herein, and may therefore be considered to include a saturation correction system 164. Data for use in, or generated as part of the saturation correction system 164 may be stored in storage 166 of the image processing system 156. The storage 166 may include at least one of volatile memory, such as a Random Access Memory (RAM) and non-volatile memory, such as Read Only Memory (ROM) or a solid state drive (SSD) such as Flash memory. The storage 16 is for example an on-chip memory or buffer that may be accessed relatively rapidly by the image signal processor 160. In other examples, though, the storage 166 may include further storage devices, for example magnetic, optical or tape media, compact disc (CD), digital versatile disc (DVD) or other data storage media. The storage 166 may be removable or non-removable from the image processing system 156. The storage 166 in FIG. 10 is communicatively coupled to the image signal processor 160 so that data can be transferred between the storage 166 and the image signal processor 160. For example, the storage 166 may store image data representative of at least a portion of an image (such as image data prior to demosaicing), the first data described above, the second data described above, the further data described above, the output data described above, and the updated image data described above.

The image signal processor 160 may also include a demosaicing system 168 for demosaicing image data (such as the updated image data after the saturation correction process) before the image data is encoded by the encoder 162.

The image processing system 156 of FIG. 10 also includes a controller 170 for controlling features or characteristics of the image sensor 158. The controller 170 may include hardware or software components or a combination of hardware and software. For example, the controller 170 may include firmware 172 which includes software for controlling the operation of the controller 170. The firmware 172 may be stored in non-volatile memory of the controller 170 or in the storage 166 (which is accessible to the controller 170). The controller 170 of FIG. 10 also includes an auto image enhancement system 174, which for example is configured to perform processing to determine whether adjustments need to be made to the image processing system 156 to improve the image quality. For example, the auto image enhancement system 174 may include an auto exposure module, an auto white balance module and/or an auto focus module. The controller 170 also includes a driver 176 for controlling the operation of the image sensor 158.

The data collection process, which may be referred to as a statistics collection process, may be performed using hardware, such as hardware of the controller 170 or of the image signal processor 160. The interpolation of statistics, for example as described with reference to FIG. 5, to obtain data representative of a saturated block from other, unsaturated, blocks, may for example be performed using firmware, such as the firmware 172 of the controller 170 or firmware associated with the image signal processor 160. The saturation correction system 164 and the demosaicing system 168 are typically implemented in software but may be implemented in hardware instead, or a combination of hardware and software. Similarly, the data collection process and the interpolation of the statistics may instead be performed using software or a combination of hardware and software.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
 receiving image data representative of at least a portion of an image comprising a first set of pixels associated with a first colour channel and a second set of pixels associated with a second colour channel;
 processing a portion of the image data representative of a first pixel of the first set of pixels to determine that the first pixel of the first set of pixels is a saturated pixel;
 obtaining, for a first image region comprising the first pixel of the first set of pixels and a first pixel of the second set of pixels, first data based on a value of the first pixel of the second set of pixels,
 based on the first data, obtaining, for a second image region comprising a second pixel of the first set of pixels and a second pixel of the second set of pixels, second data based on a value of the second pixel of the first set of pixels and a value of the second pixel of the second set of pixels; and
 processing the second data to generate output data representative of an estimated value associated with the first colour channel for the first pixel of the first set of pixels.

2. The method according to claim 1, comprising:
 identifying, within the first image region, an unsaturated pixel of the second set of pixels; and
 using the unsaturated pixel of the second set of pixels as the first pixel of the second set of pixels.

3. The method according to claim 1, comprising:
 identifying, within the second image region, an unsaturated pixel of the first set of pixels and an unsaturated pixel of the second set of pixels;
 using the unsaturated pixel of the first set of pixels as the second pixel of the first set of pixels; and
 using the unsaturated pixel of the second set of pixels as the second pixel of the second set of pixels.

4. The method according to claim 1, wherein the first data represents an intensity value of the first pixel of the second set of pixels.

5. The method according to claim 1, wherein obtaining the second data comprises retrieving the second data from a look-up table based on the first data.

6. The method according to claim 5, wherein the first data represents a first parameter value of a first parameter for the first image region, the first parameter being associated with the second colour channel, the look-up table comprises entries corresponding to a respective first parameter value of a set of first parameter values of the first parameter for the second image region and retrieving the second data from the look-up table comprises:
 identifying an entry of the entries corresponding to one of the set of first parameter values with a closest value to the first parameter value;
 identifying a second parameter value of a second parameter associated with the first colour channel, the second parameter value associated with the one of the set of first parameter values and being based on the value of the second pixel of the first set of pixels and the value of the second pixel of the second set of pixels; and retrieving the second parameter value as the second data.

7. The method according to claim 5, comprising generating the look-up table for the second image region based on:

a respective value for each of a plurality of pixels of the first set of pixels within the second image region, the plurality of pixels of the first set of pixels comprising the second pixel of the first set of pixels; and a respective value for each of a plurality of pixels of the second set of pixels within the second image region, the plurality of pixels of the second set of pixels comprising the second pixel of the second set of pixels.

8. The method according to claim 7, wherein:

each of the plurality of pixels of the first set of pixels is an unsaturated pixel, respectively; and each of the plurality of pixels of the second set of pixels is an unsaturated pixel, respectively.

9. The method according to claim 7, wherein the first data represents a first parameter value of a first parameter for the first image region, the first parameter being associated with the second colour channel, the look-up table comprises entries corresponding to a respective first parameter value of a set of first parameter values of the first parameter for the second image region, and generating the look-up table comprises:

generating, for the second image region, a histogram comprising a plurality of bins, each associated with a respective range of first parameter values;

selecting a subset of the plurality of bins, each of the subset of the plurality of bins corresponding to a respective entry of the entries; and for each of the subset of the plurality of bins, storing a corresponding second parameter value of a second parameter associated with the first colour channel as part of a respective entry corresponding to the respective bin of the subset of the plurality of bins.

10. The method according to claim 1, wherein the second data represents a ratio between the value of the second pixel of the first set of pixels and the value of the second pixel of the second set of pixels.

11. The method according to claim 1, wherein obtaining the first data comprises obtaining the first data based on the value of the first pixel of the second set of pixels and further based on a value of a first pixel of a third set of pixels associated with a third colour channel, the first image region comprising the first pixel of the third set of pixels.

12. The method according to claim 1, comprising obtaining, for a further image region comprising at least one further pixel of the first set of pixels and at least one further pixel of the second set of pixels, further data based on a respective value of the at least one further pixel of the first set of pixels and the at least one further pixel of the second set of pixels, wherein processing the second data comprises processing the second data with the further data to generate the output data.

13. The method according to claim 12, wherein:

obtaining the second data comprises obtaining the second data from a look-up table; and obtaining the further data comprises obtaining the further data for the at least one further pixel of the first set of pixels closest to the first pixel of the first set of pixels and for the at least one further pixel of the second set of pixels closest to the first pixel of the first set of pixels.

14. The method according to claim 12, wherein obtaining the further data comprises:

identifying, within the further image region, at least one unsaturated pixel of the first set of pixels and at least one unsaturated pixel of the second set of pixels;

using the at least one unsaturated pixel of the first set of pixels as the at least one further pixel of the first set of pixels; and using the unsaturated pixel of the second set of pixels as the at least one further pixel of the second set of pixels.

15. The method according to a claim 1, comprising demosaicing the at least the portion of the image after generating the output data.

16. The method according to claim 1, wherein the estimated value is larger than a saturated value of the first pixel of the first set of pixels.

17. The method according to claim 1, comprising:

determining that the first pixel of the second set of pixels is an unsaturated pixel;

determining that a first pixel of a third set of pixels associated with a third colour channel is a saturated pixel, the first image region comprising the first pixel of the third set of pixels; and based on the determining, using the first data to represent an intensity value of the first pixel of the second set of pixels.

18. The method according to claim 1, comprising:

determining that the first pixel of the second set of pixels is an unsaturated pixel;

determining that a first pixel of a third set of pixels associated with a third colour channel is an unsaturated pixel, the first image region comprising the first pixel of the third set of pixels; and based on the determining, using the first data to represent a first ratio between the value of the first pixel of the second set of pixels and the value of the first pixel of the third set of pixels.

19. An image processing system comprising:

storage for storing:

image data representative of at least a portion of an image comprising a first set of pixels associated with a first colour channel and a second set of pixels associated with a second colour channel;

first data based on a value of a first pixel of the second set of pixels;

second data based on a value of a second pixel of the first set of pixels and a value of a second pixel of the second set of pixels; and output data representative of an estimated value associated with the first colour channel for a first pixel of the first set of pixels;

a saturation correction system operable to:

process a portion of the image data representative of the first pixel of the first set of pixels to determine that the first pixel of the first set of pixels is a saturated pixel;

obtain, for a first image region comprising the first pixel of the first set of pixels and the first pixel of the second set of pixels, the first data;

based on the first data, obtain, for a second image region comprising the second pixel of the first set of pixels and the second pixel of the second set of pixels, the second data; and process the second data to generate the output data.

20. The image processing system according to claim 19, comprising a demosaicing system arranged to demosaic output image data representative of the at least the portion of the image, the output image data comprising the output data.

* * * * *